(12) United States Patent
Fafet et al.

(10) Patent No.: US 8,940,840 B2
(45) Date of Patent: Jan. 27, 2015

(54) METHOD FOR BONDING ACTIVE MOLECULES ONTO A CARRIER, ACTIVE ELEMENT OBTAINED BY SAID METHOD, AND CHEMICAL COMPOSITION FOR IMPLEMENTING SAID METHOD

(75) Inventors: Jean-François Fafet, Saint-Amarin (FR); Georges Antunes, Jungholtz (FR); Philippe Myard, Vaulx-en-Velin (FR)

(73) Assignee: Long Lasting Innovation—L2I, Jungholtz (FR)

( * ) Notice: Subject to any disclaimer, the term of this patent is extended or adjusted under 35 U.S.C. 154(b) by 1019 days.

(21) Appl. No.: 13/058,993

(22) PCT Filed: Aug. 13, 2008

(86) PCT No.: PCT/FR2008/051493
§ 371 (c)(1),
(2), (4) Date: Apr. 20, 2011

(87) PCT Pub. No.: WO2010/018311
PCT Pub. Date: Feb. 18, 2010

(65) Prior Publication Data
US 2011/0190452 A1    Aug. 4, 2011

(51) Int. Cl.
| | |
|---|---|
| *C08F 20/56* | (2006.01) |
| *B05D 1/04* | (2006.01) |
| *B05D 7/00* | (2006.01) |
| *C04B 41/00* | (2006.01) |
| *C04B 41/48* | (2006.01) |
| *C04B 41/63* | (2006.01) |
| *C09D 5/16* | (2006.01) |
| *C09D 11/00* | (2014.01) |
| *D06M 11/46* | (2006.01) |
| *D06M 13/00* | (2006.01) |
| *D06M 13/463* | (2006.01) |
| *D06M 16/00* | (2006.01) |
| *D06P 1/00* | (2006.01) |

(52) U.S. Cl.
CPC ............... *B05D 7/00* (2013.01); *C04B 41/009* (2013.01); *C04B 41/48* (2013.01); *C04B 41/63* (2013.01); *C09D 5/1606* (2013.01); *C09D 11/00* (2013.01); *D06M 11/46* (2013.01); *D06M 13/005* (2013.01); *D06M 13/463* (2013.01); *D06M 16/00* (2013.01); *D06P 1/0012* (2013.01)

USPC ........................................ 525/329.4; 427/458

(58) Field of Classification Search
USPC ....................................................... 525/329.4
See application file for complete search history.

(56) References Cited

U.S. PATENT DOCUMENTS

| | | | |
|---|---|---|---|
| 6,475,974 | B1 | 11/2002 | Leboucher et al. |
| 2009/0215913 | A1 | 8/2009 | Thies et al. |
| 2011/0293522 | A1 | 12/2011 | Wang et al. |

FOREIGN PATENT DOCUMENTS

| | | | |
|---|---|---|---|
| CN | 101163789 A | | 4/2008 |
| DE | 1519326 A1 | | 3/1970 |
| GB | 1 099 713 | | 1/1968 |
| GB | 1099713 A | * | 3/1970 |
| WO | 2004065024 A1 | | 8/2004 |
| WO | 2006111399 A2 | | 10/2006 |
| WO | 2010057080 A1 | | 5/2010 |

OTHER PUBLICATIONS

Goddard et al., "Polymer surface modification for attachment of bioactive compounds", Science Direct Prog. Polym. Sci No. 32, May 22, 2007, pp. 698-725.

* cited by examiner

*Primary Examiner* — Hui Chin
(74) *Attorney, Agent, or Firm* — Laurence A. Greenberg; Werner H. Stemer; Ralph E. Locher

(57) ABSTRACT

The invention relates to a method for bonding, onto a carrier, active molecules having an activity either against undesirable organisms or phenomena, or promoting a desired phenomenon. The method comprises: preparing a chemical composition containing at least cationic micelles each including at least one active molecule; impregnating the carrier with the cationic micelle chemical composition; bonding the active molecules onto the carrier by creating at least one electrostatic bond between the cationic micelles and the carrier. The invention also relates to an active element including a carrier and active molecules bonded onto said carrier and having an activity either against undesired organisms or phenomena, or promoting a desired phenomenon. The active element includes cationic micelles bonded onto said carrier by at least one electrostatic bond and each including at least one active molecule.

37 Claims, 1 Drawing Sheet

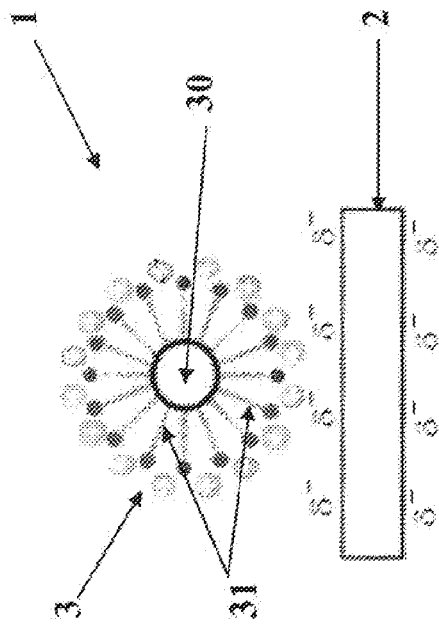
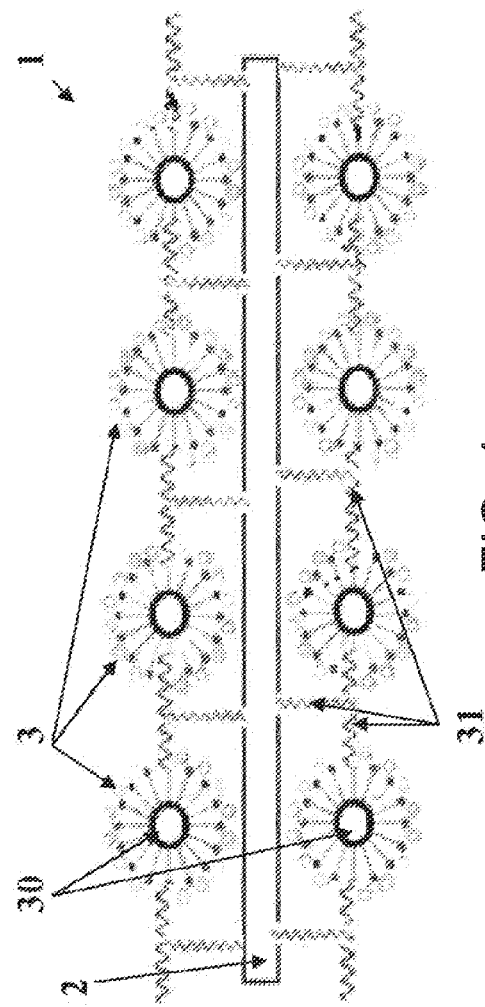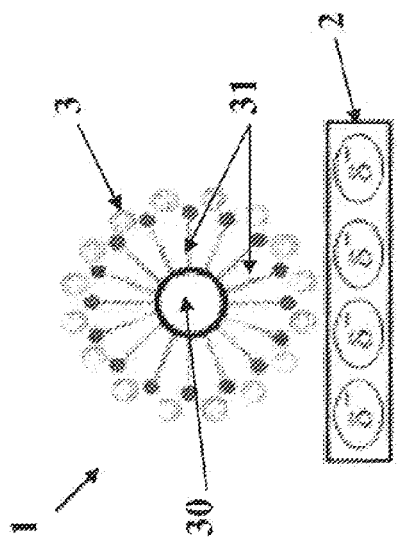
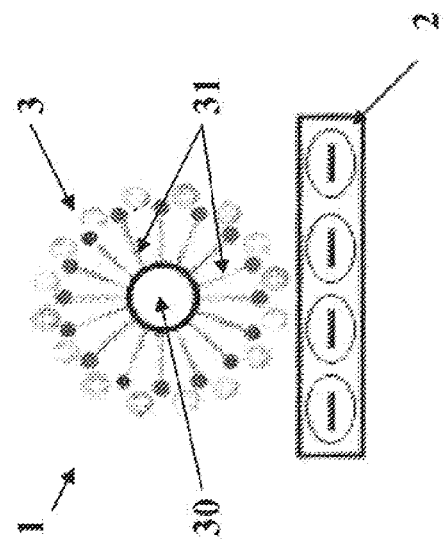

METHOD FOR BONDING ACTIVE MOLECULES ONTO A CARRIER, ACTIVE ELEMENT OBTAINED BY SAID METHOD, AND CHEMICAL COMPOSITION FOR IMPLEMENTING SAID METHOD

BACKGROUND OF THE INVENTION

Field of the Invention

The present invention relates to a method for bonding, onto a carrier, active molecules having an activity, in particular a physical, physicochemical, chemical, biochemical or biological activity, either against undesirable organisms or phenomena, or promoting a desired phenomenon. This invention also relates to an active element comprising a carrier and also such active molecules, bonded onto this carrier. Finally, the invention relates to a chemical composition for implementing this method and/or for preparing this active carrier.

The invention relates to the field of treating carriers, and may be employed when it is necessary to produce an active element comprising a carrier provided with active molecules bonded onto this carrier, this being such that this active element has specific properties, more particularly against an undesirable effect or, conversely, promoting a desired effect.

Methods for which the implementation makes it possible to bond such active molecules onto such a carrier are already known.

Thus, document EP-0.104.608 discloses a first method consisting in bonding active molecules onto a carrier by forming a covalent bond between this carrier and these molecules. In order to form such a covalent bond and to allow the attachment and orientation of the active molecules on this carrier, it is necessary to substantially modify the carrier, this being done by means of a plasma which has the drawback, firstly, of requiring a substantial input of energy and, secondly, of causing degeneration of the active molecules and/or the carrier, which thus lose their initial chemical nature and, consequently, the activity for which these molecules were chosen.

In addition, document EP-1.598.475 discloses a method consisting, first of all, in incorporating active molecules into a bath composed of an acrylic binder and of a silicone elastomer, in order to prepare a chemical composition which is subsequently used to treat the carrier which, finally, is dried at a minimum temperature of 110° C. This method has the effect of causing the active molecules to be entrapped in the acrylic binder, leading to a substantial, or even total, loss of the activity of these molecules.

Document WO2004/065024 describes a method consisting in treating a carrier with a chemical composition containing, firstly, a binder constituted of polymerizable and/or crosslinkable chemical compounds and, secondly, a chemical compound having a strong anionic nature. This treatment is supposed to provide the carrier with an ionic charge by bonding the ionic chemical compound onto the carrier by polymerization and/or crosslinking of the binder at high temperature. In this respect, it will be observed that such bonding in fact leads, on the one hand, to rigidification of the carrier and, on the other hand, to drowning of the ionic chemical compounds in the binder such that the number of ionic charges for the bonding of the active molecules is considerably reduced, or even nonexistent.

Finally, document U.S. Pat. No. 5,631,072 relates to a method for bonding an insecticide to a fabric. Such a method consists, first of all, in preparing a paste containing a dispersion of insecticide, a thickening agent, a polymer and a crosslinking agent. This method then consists in coating a carrier with this paste before polymerizing the polymer and crosslinking the crosslinking agent. This polymerization and this crosslinking have the effect of trapping the insecticide molecules in the crystalline mass of the polymer such that these molecules considerably lose their effectiveness.

It will be observed, again, that the methods described above:
- are particularly selective and are able to treat only certain types of carriers;
- permit only a low persistence of the functionalization treatment;
- do not systematically allow the active molecules to remain available and effective;
- modify the feel and the texture of the carrier;
- do not make it possible to bond all of the active molecules deposited on the carrier.

BRIEF SUMMARY OF THE INVENTION

The present invention is meant to be able to remedy the drawbacks of the prior art methods.

To this effect, the invention relates to a method for bonding, onto a carrier, active molecules having an activity, in particular a physical, physicochemical, chemical, biochemical or biological activity, either against undesirable organisms or phenomena, or promoting a desired phenomenon, this method being characterized in that:
- a chemical composition containing at least cationic micelles, each comprising at least one active molecule, is prepared;
- the carrier is impregnated with the chemical composition of cationic micelles;
- the active molecules are bonded onto the carrier by creating at least one electrostatic bond between the cationic micelles and this carrier.

The invention also relates to an active element comprising, on the one hand, a carrier and, on the other hand, active molecules bonded onto this carrier and having an activity, in particular a physical, physicochemical, chemical, biochemical or biological activity, either against undesirable organisms or phenomena, or promoting a desired phenomenon, characterized in that the active element comprises cationic micelles, on the one hand, bonded onto the carrier by at least one electrostatic bond and, on the other hand, each comprising at least one active molecule.

This invention also relates to a chemical composition for implementing the abovementioned method and/or for preparing the abovementioned active element. This chemical composition is characterized in that it contains at least cationic micelles each comprising at least one active molecule having an activity, in particular a physical, physicochemical, chemical, biochemical or biological activity, either against undesirable organisms or phenomena, or promoting a desired phenomenon.

The advantages of the present invention are that the active molecules are bonded onto the carrier by creating at least one electrostatic bond between this carrier and cationic micelles each comprising at least one such active molecule. Such a type of bond makes it possible to optimize the amount of molecules bonded onto a carrier, and to guarantee a high level of bonding and also a high persistence over time. Such a bond also allows good resistance to bad weather (for carriers installed outside) and also to washing (for washable carriers, in particular textiles).

Another advantage is that the method in accordance with the present invention makes it possible to treat any type of carrier, in particular polar, apolar or anionic carrier.

The nature and the material of such a carrier are in no way limiting and, according to one substantial advantage of the invention, it is possible to envision bonding active molecules onto any carrier, made of any material, such as wood, concrete, textile, metal, leather, ceramic, stone, paper, cardboard, or the like.

Furthermore, this method does not in any way denature the active molecules, which advantageously makes it possible to retain the chemical nature and the active properties of these molecules and to confer them on the carrier and, thus, on the active element without modification.

Other objectives and advantages of the present invention will emerge during the description that follows relating to embodiments which are given only by way of indicative and nonlimiting examples.

BRIEF DESCRIPTION OF THE SEVERAL VIEWS OF THE DRAWING

The understanding of this description will be facilitated by referring to the appended drawings in which:

FIG. 1 is a diagrammatic representation of the electrostatic bonding, onto a polar carrier, of a micelle containing an active molecule;

FIG. 2 is a diagrammatic representation of the electrostatic bonding, onto an anionic carrier, of a micelle containing an active molecule;

FIG. 3 is a diagrammatic representation of the electrostatic bonding, onto an apolar carrier, of a micelle containing an active molecule;

FIG. 4 is a diagrammatic representation of bonding, which is electrostatic and by polymerization and/or crosslinking, onto a carrier, of micelles containing an active molecule.

DESCRIPTION OF THE INVENTION

The present invention relates to the field of treating carriers 2 and may be used when it is necessary to prepare an active element 1 comprising a carrier 2 provided with active molecules 30, on the one hand, bonded onto this carrier 2 and, on the other hand, having an activity, in particular a physical, physicochemical, chemical, biochemical or biological activity, either against undesirable organisms or phenomena, or promoting a desired phenomenon.

This invention therefore relates more particularly to a method for bonding such active molecules 30 onto such a carrier 2.

Such a method comprises:
preparing a chemical composition containing at least cationic micelles 3, each comprising at least one active molecule 30;
impregnating the carrier 2 with this chemical composition of cationic micelles 3;
bonding the active molecules 30 onto the carrier 2 by creating at least one electrostatic bond between the cationic micelles and this carrier 2.

In this respect, it will be observed that the preparation of such a chemical composition can be carried out in various ways, essentially according to the type of active molecules 30 that should be arranged in the form of micelles 3.

Thus, when the active molecules 30 are of polarized type, the method consists in preparing a chemical composition of cationic micelles 3, each comprising a plurality of polarized active molecules 30. For the preparation of such a composition, a micellar solution containing micelles 3, each constituted of an assembly of a plurality of polarized active molecules 30, is first of all prepared from polarized active molecules 30.

The method then consists in adding, to this micellar solution, chemical compounds intended to cationize these micelles 3.

When the active molecules 30 are of cationic type (more particularly when these molecules have a high cationic polarity), the method comprises preparing a chemical composition of cationic micelles 3, each comprising at least one such cationic active molecule 30. The preparation of such a composition is carried out by preparing a micellar solution containing, on the one hand, cationic active molecules 30 and, on the other hand, chemical compounds 31 intended to form cationic micelles 3 with these cationic active molecules 30.

When the active molecules 30 are of neutral or cationic type (more particularly when these molecules have a low cationic polarity), the method comprises preparing a chemical composition of cationic micelles 3, each comprising at least one neutral or cationic active molecule 30, by first of all preparing, from such active molecules 30 and chemical compounds 31 intended to form micelles 3 with such active molecules 30, a micellar solution containing micelles 3, each constituted of an assembly of at least one such active molecule 30 and of at least one such chemical compound 31.

The method then comprises adding, to this micellar solution, chemical compounds intended to cationize these micelles 3.

Active molecules 30 of anionic type are also known.

For such anionic active molecules 30, a chemical composition of cationic micelles 3, each comprising at least one such anionic active molecule 30, is prepared, this being carried out:
by neutralizing these anionic active molecules 30;
by preparing, from these anionic active molecules 30 and chemical compounds 31 intended to form micelles 3 with such anionic active molecules 30, a micellar solution containing micelles 3, each constituted of an assembly of at least one such anionic active molecule 30 and of at least one such chemical compound 31;
by then adding, to this micellar solution, chemical compounds intended to cationize these micelles 3.

In this respect, it should be observed that, according to one particular embodiment of the invention, the anionic active molecules 30 are neutralized by means of specific chemical compounds incorporated into the chemical composition (more particularly into the micellar solution).

However, and according to one preferred and advantageous embodiment of the invention, the anionic active molecules 30 are neutralized with chemical compounds 31 intended to form micelles with such anionic active molecules 30, these chemical compounds 31 being chosen as of cationic type in order to provide such neutralization.

As mentioned above, the method in accordance with the invention consists, when a chemical composition is prepared, in first of all preparing a micellar solution.

Thus, and according to one additional feature of the invention, when such a micellar solution is prepared, a solution containing, on the one hand, a solvent of organic type (oil, alcohol, ketone or the like) and/or inorganic type (water or the like) and, on the other hand, active molecules 30 solubilized in this solvent, is in fact produced.

According to another embodiment, such active molecules 30 can also be in a form that is emulsifiable or dispersible in such a solvent.

In this respect, it will be observed that such an emulsion or such a dispersion can therefore be prepared either chemically (more particularly by means of emulsifiers or dispersants) or mechanically (more particularly using a compression method).

When such active molecules 30 naturally only barely form micelles 3, or not at all, the method in accordance with the invention then, and where appropriate, consists in introducing into this solution chemical compounds 31 intended to form micelles 3 with such active molecules 30.

Another feature of the method in accordance with the invention comprises, where appropriate, adding, to the cationic micellar composition (more particularly to the micellar solution), at least one acidic substance or at least one acid, in particular a mixture of acids.

In this respect, it will be observed that such an addition makes it possible, advantageously, to neutralize the pH of the chemical composition (more particularly that of the micellar solution) and also that of the carrier 2 to be treated. Furthermore, such an addition makes it possible to neutralize the alkalis present in this composition (more particularly in the micellar solution) and on this carrier 2, which, in the absence of such an addition, are capable of reacting with the chemical compounds intended to cationize these micelles.

As mentioned above, the method comprises impregnating the carrier 2 with the chemical composition of cationic micelles 3.

Such an impregnation is carried out by immersion (more particularly in a tank, a vat, a washing machine or the like), by spraying (more particularly by means of at least one spray nozzle) or by coating (more particularly by means of a scraper, a brush, a roller, or the like).

An additional feature of this method comprises, after impregnation of the carrier 2 with the cationic micellar composition, drying the impregnated carrier 2.

In this respect, it will be observed that such a drying of the carrier 2 consists, more particularly, in drying the cationic micellar composition which impregnates this carrier 2.

In fact, such drying is more particularly appropriate after impregnation of this carrier 2 by immersion. In such a case, such drying is preferably carried out after spin-drying of the impregnated carrier 2.

As regards the drying, it is carried out at a temperature between 20 and 200° C., preferably between 20 and 180° C., in particular between 20 and 150° C.

Preferably, this drying is carried out in an oven, preferably before cooling of the active element 1, either by passing said active element through a cooling zone of ventilation type, or by direct cooling of said active element on cooling rollers, or the like.

As mentioned above, the active molecules 30 are bonded onto the carrier 2 by creating at least one electrostatic bond between the cationic micelles 3 and this carrier 2.

In this respect, it should be noted that the creation of such bonding can be carried out in various ways, essentially according to the nature of the carrier 2.

Thus, when this carrier is of polar type as illustrated in FIG. 1, this carrier 2 exhibits in fact (and more particularly at the level of its surface), permanent dipoles which make it possible to create, between the dipoles of this carrier 2 and the cationic micelles 3 to be bonded onto this carrier 2, strong electrostatic bonds of "ion-dipole" type.

By way of examples, carriers 2 of polar type are known, which are constituted of:
cellulosic carriers, for instance paper, wood, flax, viscose, hemp, ramie, jute or rayon;
an ester (for example a polyester), an amide (for example a polyamide), a polyvinyl chloride (PVC);
a concrete, a cement mortar, or the like.

Carriers 2 which naturally have a high ionic polarity of anionic type, as illustrated in FIG. 2, are also known.

In such a case, the cationic micelles 3 are bonded onto such a carrier 2 by creating, between this carrier 2 and the cationic micelles 3 to be bonded onto the carrier 2, a strong electrostatic bond of the ionic type, more particularly of "ion-ion" type.

Carriers 2 of apolar type as illustrated in FIG. 3, more particularly constituted of carriers 2 comprising apolar groups, are also known.

Surprisingly, the method in accordance with the present invention also makes it possible to bond cationic micelles 3 onto carriers 2 of this type.

In this respect, it will be observed that such cationic micelles 3, in the vicinity of such an uncharged apolar carrier 2, cause a deformation of the electron cloud of this carrier 2 (polarizing field caused by the strongly cationic charge of the micelle 3) and the creation of an induced dipole. In this case, such a cationic micelle 3 (comprising at least one active molecule 30) is bonded by creating, between this carrier 2 and the cationic micelles 3 to be bonded onto the carrier 2, a strong electrostatic bond of the "ion-induced dipole" type.

By way of example of an apolar carrier 2, mention may be made of carriers 2 of polyolefin type, more particularly polyethylene, polypropylene or the like.

Thus, a cationic micelle 3 is bonded onto a carrier 2 of polar, apolar or anionic type, with the exclusion, however, of a carrier 2 of cationic type. Such bonding is carried out by creating an electrostatic bond which makes it possible, particularly advantageously, on the one hand, to efficiently and perennially bond virtually all the active molecules 30 onto such a carrier 2 and, on the other hand, to retain the properties (physical, chemical, biological) of the active molecules 30 without in any way detrimentally modifying them.

As mentioned above, certain active molecules 30 require, in order to form micelles 3, the presence of specific chemical compounds 31 intended to form such micelles 3 with these active molecules 30.

As will be disclosed in greater detail below, such chemical compounds 31 may be constituted of compounds of polymerizable and/or crosslinkable type.

In such a case, the electrostatic bonding of the cationic micelles 3 (more particularly of the active molecules 30) onto the carrier 2 can be completed by carrying out bonding by polymerization and/or crosslinking of the chemical compounds 31 intended to form cationic micelles 3 with these active molecules 30 as illustrated in FIG. 4.

The implementation of the method described above results in the obtaining of an active element 1 comprising, on the one hand, a carrier 2 and, on the other hand, active molecules (30, more particularly arranged in at least one cationic micelle 3) bonded onto this carrier 2.

In fact and according to the invention, the active element 1 comprises cationic micelles 3 which, on the one hand, are bonded onto the carrier 2 via at least one electrostatic bond and which, on the other hand, each comprise at least one active molecule 30.

As mentioned above, the active molecules 30 may be of polarized type. In such a case, the cationic micelles 3 each comprise at least a plurality of polarized active molecules 30.

In this respect, it will be observed that, in this case and according to one preferred embodiment of the invention, each cationic micelle 3 comprises a plurality of polarized active molecules 30 which can arrange themselves in the form of a micelle 3, naturally and in the absence of any additional chemical compound capable of forming such a micelle 3 with such an active molecule 30.

The active molecules 30 may also be of neutral or cationic type.

In such a case, the cationic micelles 3 each comprise, on the one hand, at least one such neutral or cationic active molecule 30 and, on the other hand, at least one chemical compound 31, of nonionic or cationic type, forming a cationic micelle 3 with at least one such active molecule 30.

Finally, these active molecules 30 may also be of anionic type.

The cationic micelles 3 then each comprise, on the one hand, at least one anionic active molecule 30 and, on the other hand, at least one chemical compound 31, preferably of cationic type, forming a cationic micelle 3 with at least one such anionic active molecule 30 and, where appropriate (more particularly when the chemical compound 31 forming a micelle 3 with the active molecule 30 is not of cationic type or is not capable of electrically neutralizing such a molecule), at least one chemical compound intended to electrically neutralize such an anionic active molecule.

As mentioned above, a cationic micelle 3 may comprise at least one chemical compound 31 forming such a micelle 3 with at least one active molecule 30 (which is anionic, neutral or cationic).

In this respect, it will be observed that, according to a first embodiment, such a chemical compound 31 may be constituted of a surfactant.

However and according to another embodiment, such a chemical compound 31 may be constituted of a compound of polymerizable and/or crosslinkable type.

As mentioned above, the active element 1 in accordance with the invention comprises a carrier 2 and also active molecules 30 bonded onto this carrier 2. Such a carrier 2 may then, and as described above, be of polar type (FIG. 1), apolar type (FIG. 3) or anionic type (FIG. 2), while the electrostatic bond between a cationic micelle 3 and this carrier 2 is of ion-dipole, ion-induced dipole or ionic (ion-ion) type, respectively.

The invention has a particularly polyvalent nature such that the implementation of the abovementioned method makes it possible to obtain a plurality of singularly different active elements 1 comprising different active molecules 30 having an activity, in particular a physical, physicochemical, chemical, biochemical or biological activity, either against undesirable organisms or phenomena, or promoting a desired phenomenon.

Thus and according to a first embodiment, the active molecules 30 can have an activity in the prophylactic or curative treatment of a disease.

In such a case, such active molecules 30 may be combined with a carrier 2 constituted of a protective element (more particularly a dressing) or of an element of clothing (more particularly a garment, in particular an "intelligent" garment).

According to a second embodiment, the active molecules 30 can have an activity against pathogenic elements and/or microorganisms, in particular viruses, bacteria, microbes or the like.

In this respect, it will be observed that such an activity may be of biocidal type. The active molecules 30 having such an activity can then be constituted of isothiazolinone derivatives, silver salts, triclosan, titanium dioxide or the like.

According to a third embodiment, the active molecules 30 have an activity promoting a visual phenomenon associated with this carrier 2. Such a visual phenomenon may be a photoluminescence, a fluorescence or a coloring of this carrier 2.

According to a fourth embodiment, the active molecules 30 have an activity against parasites (in particular animal parasites) or animals, more particularly acarids or insects.

Such an activity may be of repellent, uncomfortable or lethal type.

More particularly, such active molecules 30 may be of pesticide type, insecticide type, insect-repellent type, or the like.

By way of example, it is possible to use active molecules 30 of pesticide type, such as permethrin, deltamethrin, fenitrothion, cyfluthrin, geraniol, DEET, DDT, imidazol compounds and triazol compounds, linuron or diuron, malathion, or the like.

According to a fifth embodiment, the active molecules 30 have an activity against the bonding of staining products onto said carrier 2.

According to a sixth embodiment, the active molecules 30 have an activity against radiation, in particular ultraviolet radiation. Such molecules 30 may more particularly be titanium dioxide.

According to a seventh embodiment, the active molecules 30 can have an activity against fungi (these active molecules then being of the fungicide type) or plants, in particular weeds (these active molecules then being of the herbicide type), mosses, plant parasites (these active molecules then being of the pesticide type) or the like.

Finally, the active molecules 30 may have an activity against olfactory pollution, more particularly that occasioned by substances produced by the human or animal body (sweat, urine, excrement), by waste (refuse, waste water) or by organic or plant residues.

Such active molecules 30 can be used for treating all sources which generate such olfactory pollution, and preferably have an activity in the context of the treatment of odors by neutralization.

By way of example, it is possible to use active molecules 30 chosen from the following compounds: aliphatic alcohols (such as decanol, citronellol, geraniol), aldehydes (such as normal or branched dodecanal), phenols (such as eugenol and isoeugenol).

In fact, these active molecules 30 can be bonded onto at least one given type of carrier 2.

In this respect, it will be observed that such a carrier 2 can then be constituted, at least partly, of:

- an element of clothing (garment, in particular combat clothing);
- a covering element;
- an element of decoration (curtain, hanging, net curtain, stretched ceiling);
- a sheltering element (tent);
- a protection element (dressing, tarpaulin, shade, mosquito net).

In one particular embodiment, the carrier 2 can be made, at least in part, of a textile material (natural or synthetic). Such a material may be of the knitted type, woven type, nonwoven type, or the like, and be constituted of natural, artificial or synthetic fibers and/or filaments, for instance polyester, viscose, cotton, wool, polyamide, aramid, silk, polypropylene or polyethylene, or else a mixture of various fibers and/or filaments.

In fact, the elements described above can then receive active molecules 30 as described above and having an activity either promoting a visual phenomenon or against:

- pathogenic elements and/or microorganisms;
- parasites or animals;
- the bonding of staining products onto said carrier;
- irradiation;

fungi or plants;
olfactory pollution (sweat).

Another type of embodiment may be that the carrier 2 is constituted of:
- a constituent element (wall, ceiling, floor, balcony, terrace, roof, frame, beam, closing device, door, window);
- a covering element (stretched ceiling);
- an element of decoration (paint, filler, curtain, hanging, paving stone, cobblestone, tile);
- a storage element (bin, skip);
- an element of equipment (sanitation equipment, in particular a urinal);
- a protection element (swing shutter, roller shutter, shade, mosquito net) that is part of a building, in particular living quarters, a storage building, a farm building, a building for public use (in particular public lavatories).

Such an element may then be made of any material such as wood, concrete, textile, metal, leather, ceramic, stone, paper, cardboard, plastic, or the like.

Once again, such an element can receive active molecules 30 as described above and having an activity either promoting a visual phenomenon or against pathogenic elements and/or microorganisms, parasites or animals, the bonding of staining products onto said carrier, radiation, fungi or plants, or olfactory pollution.

Finally, in a further type of embodiment, the carrier 2 is constituted of an element of equipment for storing, conveying and/or treating waste.

In this respect, it will be observed that such an element can then be constituted of an element of equipment for conveying (dump trucks, pipes, sewers) and/or treating (purification plants) waste, more particularly waste water.

As mentioned above, the invention relates, on the one hand, to a method for bonding active molecules 30 onto a carrier 2 and, on the other hand, to an active element 1 comprising such a carrier 2 and such molecules 30.

The invention then also relates to a chemical composition for implementing this method and/or for preparing this active element 1.

As mentioned above, this chemical composition contains at least cationic micelles 3, each comprising at least one active molecule 30 having an activity, in particular a physical, physicochemical, chemical, biochemical or biological activity, either against undesirable organisms or phenomena, or promoting a desired phenomenon.

According to a first embodiment, such a chemical composition comprises micelles 3, each comprising at least one active molecule 30 of polarized type and each preferably constituted of an assembly of a plurality of these polarized active molecules 30.

In such a case, this chemical composition also comprises at least one chemical compound intended to cationize such a micelle 3.

According to a second embodiment, the chemical composition contains cationic micelles 3, each comprising at least one cationic active molecule 30, more particularly one cationic active molecule 30 having a high cationic polarity.

This cationic micelle 3 also then comprises at least one chemical compound 31 forming a cationic micelle with at least one such cationic active molecule 30.

According to a third embodiment, the chemical composition contains micelles 3, each comprising, on the one hand, at least one neutral or cationic active molecule 30 (more particularly a molecule having a low cationic polarity) and, on the other hand, at least one chemical compound 31 forming a micelle 3 with at least one such neutral or cationic active molecule 30.

Such a chemical composition then also contains at least one chemical compound intended to cationize such a micelle 3.

A fourth embodiment relates to a chemical composition containing, on the one hand, micelles 3 comprising at least one anionic active molecule 30, at least one chemical compound 31 (preferably of cationic type) forming a micelle 3 with at least one such anionic active molecule 30, and, where appropriate (more particularly when the chemical compound forming a micelle 3 with the active molecule 30 is not of cationic type or is not capable of electrically neutralizing such an anionic active molecule 30), at least one chemical compound (preferably of cationic type) intended to electrically neutralize such an anionic active molecule 30.

In this respect, it should be observed that the chemical compound intended to electrically neutralize an anionic active molecule 30 is constituted of a chemical compound (preferably of cationic type, in particular a cationic polymer) distinct from that forming a micelle 3 with at least one such anionic active molecule 30.

However, and according to one preferred embodiment, the chemical compound intended to electrically neutralize such an anionic active molecule 30 is constituted of the chemical compound 31 (preferably cationic) forming a micelle 3 with at least one such anionic active molecule 30 (such a compound being, more particularly, constituted of a cationic polymer).

Finally and in accordance with this fourth embodiment, the chemical composition contains even further at least one chemical compound intended to cationize such a micelle 3.

As mentioned above, this chemical composition can, according to the type of active molecule 30 under consideration, contain at least one chemical compound 31 forming a micelle 3 with at least one active molecule 30.

In this respect, it will be observed that such a chemical compound 31 may be constituted of a polymerizable and/or crosslinkable compound, in particular of nonionic or cationic type.

By way of example of a nonionic polymerizable and/or crosslinkable compound, it is possible to use a binder of the styrene butadiene, polyurethane, acrylic, urethane or vinyl acetate type, or the like, or even a mixture based on at least one of these compounds.

The concentration of such a nonionic polymerizable and/or crosslinkable compound preferably ranges between 0.1% and 30% (which corresponds to an amount of compound of between 1 g and 300 g per liter of composition).

However, and according to another embodiment, such a chemical compound 31 forming a micelle may be further constituted of a surfactant, in particular of nonionic or cationic type.

As mentioned above, the chemical composition can, according to the type of active molecule 30 under consideration, contain at least one chemical compound intended to cationize a micelle 3.

Such a chemical compound is constituted of a chemical compound having a high cationic polarity, more particularly a molecule comprising at least one atom having at least one cationic charge.

In this respect, it will be observed that a chemical compound intended to cationize a micelle 3 can be constituted of a quaternary ammonium derivative or of a molecule having at least one quaternized nitrogen atom.

By way of example, such a chemical compound may be constituted of a cationic surfactant, more particularly chosen from alkyltrimethylammonium halides, benzethonium halides and cationic derivatives of nitrogenous heterocycles.

Such a cationic chemical compound may also derive from monomers chosen from the following monomers:
N,N-dimethylaminomethylacrylamide or -methacrylamide;
2-(N,N-dimethylamino)ethylacrylamide or -methacrylamide;
3-(N,N-dimethylamino)propylacrylamide or -methacrylamide;
4-(N,N-dimethylamino)butylacrylamide or -methacrylamide;
2-(dimethylamino)ethyl acrylate;
2-(dimethylamino)ethyl methacrylate;
3-(dimethylamino)propyl methacrylate;
2-(tert-butylamino)ethyl methacrylate;
2-(dipentylamino)ethyl methacrylate;
2-(diethylamino)ethyl methacrylate;
vinylpyridines;
vinylamine;
vinylimidazolines;
trimethylammoniopropyl methacrylate chloride;
trimethylammonioethylacrylamide or methacrylamide chloride or bromide;
trimethylammoniobutylacrylamide or methacrylamide methyl sulfate;
trimethylammoniopropylmethacrylamide methylsulfate;
(3-methacrylamidopropyl)trimethylammonium chloride;
(3-acrylamidopropyl)trimethylammonium chloride;
methacryloyloxyethyl trimethylammonium chloride or methylsulfate;
acryloyloxyethyl trimethylammonium chloride or acryloyloxyethyl trimethylammonium methylsulfate;
1-ethyl-2-vinylpyridinium or 1-ethyl-4-vinylpyridinium bromide, chloride or methylsulfate;
N,N-dimethyldiallylammonium chloride;
dimethylaminopropylmethacrylamide, N-(3-chloro-2-hydroxypropyl)trimethylammonium chloride.

The concentration of such a compound intended to cationize a micelle 3 preferably ranges between 5% and 10% (which corresponds to an amount of compound of between 50 g and 100 g per liter of composition).

Another feature mentioned above concerns the fact that the chemical composition further contains at least one acidic substance or at least one acid, in particular a mixture of acids, with the aim of neutralizing the pH of the composition and of the carrier 2 (more particularly for neutralizing the alkalis present in the medium and on the carrier 2).

Finally, and as mentioned above, this composition contains a solvent of organic type (oil, alcohol, ketone or the like) and/or inorganic type (water or the like).

Examples of Application and of Formulation and Results Obtained:

I Insecticidal Treatment of a Textile Carrier:

The treatment consists in applying a chemical composition containing active molecules of permethrin-based insecticide type onto a textile carrier constituted of a 100% polyester knit having a mass per unit area of 35 g/m². The target amount of permethrin to be bonded onto the carrier is 1000 mg/m². The actual concentration of permethrin on the carrier depends on the concentration of insecticide in the bath and the degree of uptake (amount of bath taken up by the carrier).

The bonding method comprises:
preparing an insecticidal chemical composition containing:
1. 98 g/liter of a formulation of permethrin in an emulsion at 50% to;
2. 20 g/liter of a nonionic binder;
3. 2 g/liter of a nonionic wetting agent;
4. 60 g/liter of a quaternary ammonium derivative;
5. 2 g/liter of an 80% acetic acid solution;
treating a textile carrier by impregnation of this carrier using a vat;
drying the active element on a tenter at a temperature of 120° C.

A degree of uptake of the order of 65% (0.65 liter of bath/kg of textile carrier) is observed when carrying out the process as described above.

Results Obtained:

Long-term persistence of an insecticide impregnating a net

Test Method:

Mosquitoes of a sensitive strain of *Anopheles gambiae* s.s. are exposed to the test fabric for three minutes. Geigy cages are used for this purpose. Non-engorged three to five-day-old females are introduced, in batches of 11, into the cages. A total of 44 females are used to test each sample.

The tests are carried out at a temperature of between 23° C. and 25° C. at a relative humidity of 50% to 70%. The observation performed during the 24 hours following the introduction of the mosquitoes into the cage is carried out at a temperature of 28° C. at a relative humidity of 70%.

Results

Objects: Tulle E0, E1, E2; ready-made green tulle

| Net no. | Washings | Cage | n | 3' kd | % Kd | 1 h kd | % kd | 24 h death | % death |
|---|---|---|---|---|---|---|---|---|---|
| E0 | TQ | | 11 | 2 | 18 | 9 | 82 | 8 | 75 |
| | TQ | | 11 | 3 | | 10 | | 8 | |
| | TQ | | 11 | 1 | | 8 | | 8 | |
| | TQ | | 11 | 2 | | 9 | | 9 | |
| E1 | 20 L | | 11 | 7 | 52 | 9 | 86 | 10 | 91 |
| | 20 L | | 11 | 6 | | 9 | | 11 | |
| | 20 L | | 11 | 5 | | 10 | | 9 | |
| | 20 L | | 11 | 5 | | 10 | | 10 | |
| E2 | 30 L | | 11 | 8 | 73 | 10 | 84 | 8 | 86 |
| | 30 L | | 11 | 9 | | 9 | | 11 | |
| | 30 L | | 11 | 7 | | 9 | | 9 | |
| | 30 L | | 11 | 8 | | 9 | | 10 | |

The washings were carried out according to textile standard ISO 6330 at a temperature of 40° C.
Kd means knock down.

The Kd corresponds to the number of mosquitoes which react to the effect of the insecticide. Said mosquitoes show signs of weakening and are incapable of biting.

3' kd: The kd is checked after 3 minutes of observation.

1 h kd: The kd is checked after 60 minutes of observation.

24 h actual death: Number of mosquitoes dead after 24 hours of observation.

II Odor-Neutralizing Treatment of a Concrete Carrier:

The treatment consists in applying a chemical composition containing active molecules intended for neutralizing odors on the basis of a mixture of geraniol and eugenol, onto a concrete carrier. The actual concentration of the mixture of geraniol and eugenol to be bonded onto the carrier depends on the concentration of the mixture in the bath, on the level of odors to be neutralized and on the amount of bath deposited onto the carrier.

The bonding method comprises:
preparing an odor-neutralizing chemical composition containing:
1. 739 g/liter of a formulation of a mixture of geraniol and eugenol in an emulsion at 30%;
2. 200 g/liter of a nonionic binder;
3. 1 g/liter of an anti-moss agent;
4. 50 g/liter of a quaternary ammonium derivative;
5. 10 g/liter of an 80% acetic acid solution;
treating a concrete carrier by spraying this carrier;

drying the active element at ambient temperature (between 20° C. and 25° C.)

Results Obtained:

Long-term persistence: the odor-neutralizing treatment was effective over a period ranging up to ten weeks. Note: When the odor-neutralizing treatment is carried out without a bonding system (application only of the mixture of geraniol and eugenol), the odor-neutralizing treatment is effective for a maximum period of 4 to 5 days.

The invention claimed is:

1. A method for bonding, onto a carrier, active molecules having a physical, physicochemical, chemical, biochemical or biological activity, either against undesirable organisms or phenomena, or promoting a desired phenomenon, this method being characterized by the steps comprising:
   providing a chemical composition containing cationic micelles, each containing at least one active molecule, and at least one polymerizable and/or crosslinkable chemical compound suitable for forming a micelle with at least one of the active molecules that is prepared, by preparing a micellar solution containing, at least one of the active molecules and optionally, at least one polymerizable and/or crosslinkable chemical compounds suitable to form micelles with the active molecules;
   impregnating the carrier with the chemical composition of cationic micelles;
   bonding the active molecules onto the carrier by creating at least one electrostatic bond between the cationic micelles and this carrier;
   polymerizing and/or crosslinking the electrostatic bonding of the active molecules onto the carrier of the chemical compounds suitable to form micelles with these active molecules.

2. The bonding method as claimed in claim 1, characterized in that the chemical composition of cationic micelles, each comprising at least one cationic active molecule, is prepared by preparing a micellar solution containing at least one cationic active molecule, and, optionally, polymerizable and/or crosslinkable chemical compounds suitable to form cationic micelles with these cationic active molecules.

3. The bonding method as claimed in claim 1, characterized in that a chemical composition of cationic micelles, each comprising at least one neutral or cationic active molecule, is prepared, this being carried out:
   preparing, from such active molecules and polymerizable and/or crosslinkable chemical compounds suitable to form micelles with such active molecules, a micellar solution containing micelles, each constituted of an assembly of at least one such active molecule and of at least one such chemical compound;
   subsequently adding, to this micellar solution, chemical compounds intended to cationize these micelles.

4. A bonding method characterized in that a chemical composition of cationic micelles, each comprising at least one anionic active molecule, is prepared, this being carried out by the steps comprising:
   providing a chemical composition containing cationic micelles, each containing at least one active molecule, and at least one polymerizable and/or crosslinkable chemical compound suitable for forming a micelle with at least one of the active molecule that is prepared, by preparing a micellar solution containing, at least one of the active molecules and optionally, at least one polymerizable and/or crosslinkable chemical compounds suitable to form micelles with the active molecules;
   impregnating the carrier with the chemical composition of cationic micelles;
   bonding the active molecules onto the carrier by creating at least one electrostatic bond between the cationic micelles and this carrier;
   polymerizing and/or crosslinking the electrostatic bonding of the active molecules onto the carrier of the chemical compounds suitable to form micelles with these active molecules;
   neutralizing the anionic active molecules;
   preparing, from the anionic active molecules and polymerizable and/or crosslinkable chemical compounds suitable to form micelles with the anionic active molecules, a micellar solution containing micelles, each constituted of an assembly of at least one anionic active molecule and of at least one of the chemical compound; and
   adding, to the micellar solution, chemical compounds suitable to cationize the micelles.

5. A bonding method for bonding, onto a carrier, active molecules having a physical, physicochemical, chemical, biochemical or biological activity, either against undesirable organisms or phenomena, or promoting a desired phenomenon, this method being characterized by the steps comprising:
   providing a chemical composition containing cationic micelles, each containing at least one active molecule, and at least one polymerizable and/or crosslinkable chemical compound suitable for forming a micelle with at least one of the active molecules that is prepared, by preparing a micellar solution containing, at least one of the active molecules and optionally, at least one polymerizable and/or crosslinkable chemical compounds suitable to form micelles with the active molecules;
   impregnating the carrier with the chemical composition of cationic micelles;
   bonding the active molecules onto the carrier by creating at least one electrostatic bond between the cationic micelles and this carrier;
   polymerizing and/or crosslinking the electrostatic bonding of the active molecules onto the carrier of the chemical compounds suitable to form micelles with these active molecules;
   wherein the micellar solution includes at least one of a solvent of organic and/or inorganic and, optionally, active molecules solubilized, dispersed or emulsified in the solvent before introducing therein the polymerizable and/or crosslinkable chemical compounds suitable to form micelles with such active molecules whereby the cationic micelles each comprise at least one anionic active molecule and, optionally, at least one polymerizable and/or crosslinkable cationic chemical compound forming a cationic micelle with at least one such anionic active molecule and, optionally, at least one chemical compound suitable to electrically neutralize such an anionic active molecule.

6. The bonding method as claimed in claim 1, characterized in that at least one acidic substance or a mixture of acids, is added to the cationic micellar composition.

7. The bonding method as claimed in claim 1, characterized in that the carrier is impregnated by immersion, spraying or coating.

8. The bonding method as claimed in claim 1, characterized in that, after impregnation of the carrier with the chemical composition of cationic micelles, the impregnated carrier is dried by spin-drying of the impregnated carrier.

9. The bonding method as claimed in claim 1, characterized in that the active molecules are bonded onto a carrier of polar, apolar or anionic, by creating an electrostatic bond of ion-dipole, ion-induced dipole or ionic, respectively, between the cationic micelles and this carrier.

10. An active element comprising a carrier and active molecules, bonded onto this carrier and having an activity, in particular a physical, physicochemical, chemical, biochemical or biological activity, either against undesirable organisms or phenomena, or promoting a desired phenomenon, characterized in that the active element comprises cationic micelles which comprise at least one active molecule and also at least one polymerizable and/or crosslinkable chemical compound forming a cationic micelle with at least one such active molecule, and which are bonded onto the carrier via at least one electrostatic bond and also by polymerization and/or crosslinking.

11. The active element as claimed in claim 5, characterized in that the cationic micelles each comprise, at least one neutral or cationic active molecule and, at least one polymerizable and/or crosslinkable chemical compound, of nonionic or cationic, forming a cationic micelle with at least one such active molecule.

12. The active element as claimed in claim 5, characterized in that the carrier is of polar, apolar or anionic, while the electrostatic bond between a cationic micelle and this carrier is of ion-dipole, ion-induced dipole or ionic, respectively.

13. The active element as claimed in claim 5, characterized in that the active molecules have an activity in the prophylactic or curative treatment of a disease.

14. The active element as claimed in claim 5, characterized in that the active molecules have an activity against pathogenic elements and/or microorganisms.

15. The active element as claimed in claim 5, characterized in that the active molecules have an activity promoting a visual phenomenon associated with this carrier.

16. The active element as claimed in claim 5, characterized in that the active molecules have an activity against parasites or animals.

17. The active element as claimed in claim 5, characterized in that the active molecules have an activity against the bonding of staining products onto said carrier.

18. The active element as claimed in claim 5, characterized in that the active molecules have an activity against radiation.

19. The active element as claimed in claim 5, characterized in that the active molecules have an activity against fungi or plants.

20. The active element as claimed in claim 5, characterized in that the active molecules have an activity against olfactory pollution.

21. The active element as claimed in claim 9, characterized in that the carrier is constituted, at least partly, of an element of clothing, a covering element, an element of decoration, a storage element, an element of equipment, a sheltering element or a protection element.

22. The active element as claimed in claim 10, characterized in that the carrier is constituted of a constituent element, an element of decoration, a storage element, an element of equipment or a protection element that is part of a building.

23. The active element as claimed in claim 10, characterized in that the carrier is constituted of an element of equipment for storing, conveying and/or treating waste water.

24. A chemical composition for implementing the method as claimed in claim 1, and/or for preparing the active element as claimed in claim 5, characterized in that this chemical composition contains at least cationic micelles, each comprising, at least one active molecule having an activity a physical, physicochemical, chemical, biochemical or biological activity, either against undesirable organisms or phenomena, or promoting a desired phenomenon and, at least one polymerizable and/or crosslinkable chemical compound forming a micelle with at least one such active molecule.

25. The chemical composition as claimed in claim 19, characterized in that it contains cationic micelles, each comprising at least one cationic active molecule, and also at least one polymerizable and/or crosslinkable chemical compound forming a cationic micelle with at least one such cationic active molecule.

26. The chemical composition as claimed in claim 19, characterized in that it contains, micelles, each comprising at least one neutral or cationic active molecule, and also at least one polymerizable and/or crosslinkable chemical compound forming a micelle with at least one such active molecule and, at least one chemical compound intended to cationize such a micelle.

27. The chemical composition as claimed in claim 19, characterized in that it contains, micelles comprising at least one anionic active molecule, at least one polymerizable and/or crosslinkable chemical compound forming a micelle with at least one such anionic active molecule and, where appropriate, at least one chemical compound intended to electrically neutralize such an anionic active molecule and, even further, at least one chemical compound intended to cationize such a micelle.

28. The chemical composition as claimed in claim 22, characterized in that the chemical compound intended to electrically neutralize an anionic active molecule is constituted of the polymerizable and/or crosslinkable chemical compound, of cationic, forming a micelle with at least one such anionic active molecule.

29. The chemical composition as claimed in claim 19, characterized in that the polymerizable and/or crosslinkable chemical compound forming a micelle with at least one active molecule is of nonionic or cationic.

30. The chemical composition as claimed in claim 21, characterized in that the chemical compound intended to cationize a micelle is a compound having a high cationic polarity comprising at least one atom having at least one cationic charge.

31. The chemical composition as claimed in claim 21, characterized in that the chemical compound intended to cationize a micelle is a cationic surfactant having either of a quaternary ammonium derivative or at least one quaternized nitrogen atom.

32. The chemical composition as claimed in claim 19, characterized in that it contains at least one acidic substance or at least one acid.

33. The chemical composition as claimed in claim 19, characterized in that it contains a solvent of organic and/or inorganic.

34. The active element as claimed in claim 5, characterized in that the active molecules have an activity against viruses, bacteria, microbes or combinations thereof.

35. The active element as claimed in claim 5, characterized in that the active molecules have an activity against acarids or insects.

36. The active element as claimed in claim 5, characterized in that the active molecules have an activity against ultraviolet radiation.

37. The active element as claimed in claim 5, characterized in that the active molecules have an activity against weeds, mosses, plant parasites or combinations thereof.

* * * * *